Patented Feb. 27, 1934

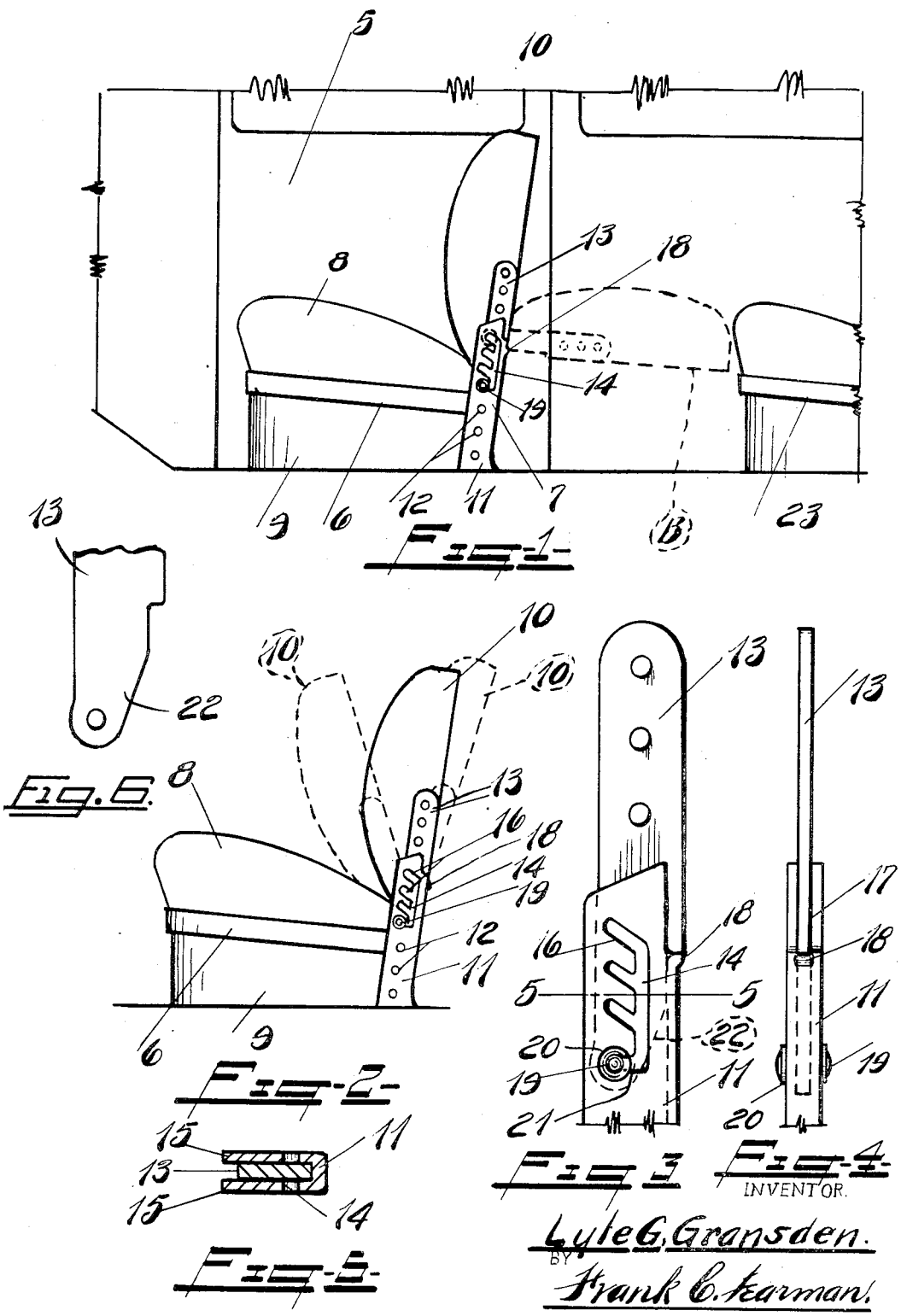

1,949,252

UNITED STATES PATENT OFFICE 1,949,252

ADJUSTABLE HINGE

Lyle G. Gransden, Edenville, Mich.

Application August 7, 1933. Serial No. 683,924

3 Claims. (Cl. 155—7)

This invention relates to hinges, and more particularly to hinges such as used on vehicle seats to permit the seat back rest to be adjusted to any angular position, or to permit it to swing back to horizontal position so that it is level with the seat cushion proper to form a bed.

One of the prime objects of the invention is to design a very simple, practical, and substantial hinge which can be quickly and easily adjusted, which automatically remains in set position, and which is adaptable for vehicles, chairs, davenports, or in fact any article of furniture which requires an adjustable back.

Another object is to provide an adjustable hinge of simple construction, which is cheap to manufacture, and easy to adjust and install.

The above and other objects will appear as the specification progresses, reference being had to the accompanying drawing in which I have shown the preferred embodiment of my invention, and in which like references indicate like parts throughout the several views thereof.

In the drawing—

Fig. 1 is a fragmentary side elevation of an automobile (preferably of coach design), showing the interior and my adjustable hinge in position, the broken lines showing the back rest swung down to form a bed.

Fig. 2 is a side view of the front seat, the broken lines showing the back rest in both a forward and a back position.

Fig. 3 is an enlarged fragmentary detail side view of the hinge.

Fig. 4 is an edge view thereof.

Fig. 5 is a transverse sectional plan view taken on the line 5—5 of Fig. 3.

Fig. 6 is a fragmentary view of the lower end of the upper strap.

Referring now more specifically to the drawing wherein, for the purpose of illustration, I have shown a fragmentary view of an automobile body 5, the front seat 6 of which is equipped with my adjustable hinge 7, said seat comprising a bottom cushion 8 supported on the seat support 9 as usual, the cushioned back rest 10 of the front seat being hinged so that it may be tilted forwardly as shown in broken lines in Fig. 2 of the drawing, or tilted rearwardly to position "B" to form a bed and as indicated in broken lines in Figure 1.

The hinge can be stamped, cast, or formed in any other desired manner, and comprises the lower bracket member 11 secured to the seat frame by means of screws 12 or the like, said bracket being formed U-shape in cross section to slidably receive the upper strap or hinge section 13, and which is secured to the back rest of the seat in a similar manner. A vertically extending slot 14 is formed in each leg 15 of the bracket 11, and spaced apart upwardly inclined passages 16 open into said slot 14 and for a purpose to be presently described, the bight portion of the bracket 11 is disposed towards the rear of the vehicle and forms the back wall of the bracket, said wall being slotted as shown at 17, and a shoulder or abutment 18 is provided as shown, and against which the back edge of the strap 13 rests when the back is tilted.

A transversely disposed pin 19 is mounted in the lower end of the strap 13 and is adapted to travel in the slot 14, washers 20 being provided on the end as shown, and when the back rest is in position as shown in solid lines in Fig. 1, said pin rests in the lower horizontally disposed passage 21. The lower end of the strap 13 is slightly tapered as shown at 22 so that the back rest may be tilted forwardly as shown in broken lines in Fig. 2 of the drawing to permit ready and free access to the rear seat 23 of the vehicle, and as necessary in a coach body design.

When it is desired to adjust the back rest to a certain angle of inclination, the operator raises the back rest until the pins 19 enter the proper passage in the strap members 13; the back edge of said strap bears against the abutment 18, and the adjustment is complete.

When it is desired to use the seats of the vehicle as a bed, the back rest of the front seat is raised until the pins 19 engage the upper horizontally disposed slot, and the back rest will then be horizontal and level with the front seat cushion. The back rest and seat cushion will then be at the same elevation as the rear seat, forming a bed on which blankets can be placed and a comfortable bed results.

To again convert the body for travel, it is merely necessary to swing the back rest upwardly, then lower until the pins 19 engage the passage 16 which conforms to the angle of inclination desired. The conversion is simple and easy and requires a minimum of time and effort.

From the foregoing description it will be obvious that I have perfected a very simple, practical, and convenient adjustable hinge for use on vehicles and on any furniture or articles requiring adjustable back rests.

What I claim is:

1. An adjustable hinge for a vehicle seat or the like, and comprising a U-shaped bracket member adapted to be rigidly secured to a seat frame with its bight portion disposed towards the rear, a vertically disposed slot in said bracket, a plurality of spaced apart forward and upwardly inclined slots opening into said vertical slot, an extension member slidably and adjustably connected to said bracket and provided with a pin for selective engagement with one of said inclined slots, and a rest on the back wall of the bracket to limit the tilting action of the upper extension member with relation to the bracket.

2. An adjustable hinge of the class described and comprising a U-shaped bracket member adapted to be secured to a stationary support with its bight portion disposed towards the rear, elongated vertically disposed slots in the legs of said bracket and spaced apart inclined slots opening thereinto, an extension member mounted between the legs of said U-shaped bracket and provided with a pin for selective engagement with one of said slots, and an open passage in the back wall of said bracket and terminating in an abutment for limiting the backward tilt of said hinge extension.

3. An adjustable hinge of the class described, and comprising a U-shaped bracket member adapted to be rigidly secured to a stationary support with its bight portion disposed towards the rear, a plurality of vertically spaced horizontally disposed slots formed in said bracket, a vertically disposed main slot open to one end of said horizontally disposed slots, an extension strap member slidably mounted in said bracket and formed with a tapered lower end section to permit a limited forward swing of the strap member, a pin mounted in the lower end of said strap member with its ends projecting into said main slot, said pin selectively engaging in one of said slots as the extension strap is raised and swung rearwardly, and a stop on the back wall of the bracket for limiting the rearward swing of said extension strap.

LYLE G. GRANSDEN.